US009094329B2

(12) United States Patent
Bryant et al.

(10) Patent No.: US 9,094,329 B2
(45) Date of Patent: Jul. 28, 2015

(54) AVOIDING MICRO-LOOPS IN A RING TOPOLOGY OF A NETWORK

(75) Inventors: Stewart Frederick Bryant, Merstham (GB); Clarence Filsfils, Brussels (BE); Ian Michael Charles Shand, Cobham (GB)

(73) Assignee: Cisco Technology, Inc., San Jose, CA (US)

(*) Notice: Subject to any disclaimer, the term of this patent is extended or adjusted under 35 U.S.C. 154(b) by 932 days.

(21) Appl. No.: 13/269,617

(22) Filed: Oct. 9, 2011

(65) Prior Publication Data
US 2013/0088974 A1    Apr. 11, 2013

(51) Int. Cl.
| H04L 12/26 | (2006.01) |
| H04L 12/28 | (2006.01) |
| H04L 12/703 | (2013.01) |
| H04L 12/705 | (2013.01) |
| H04L 12/437 | (2006.01) |

(52) U.S. Cl.
CPC .............. H04L 45/28 (2013.01); H04L 12/437 (2013.01); H04L 45/18 (2013.01)

(58) Field of Classification Search
CPC ........ H04L 45/18; H04L 45/48; H04L 12/437
See application file for complete search history.

(56) References Cited

U.S. PATENT DOCUMENTS

| 5,925,137 | A  | * | 7/1999  | Okanoue et al. ........... 714/4.1 |
| 6,301,267 | B1 | * | 10/2001 | Ben-Ami .................... 370/468 |
| 6,366,561 | B1 | * | 4/2002  | Bender ........................ 370/238 |
| 6,711,152 | B1 | * | 3/2004  | Kalmanek et al. ........... 370/351 |
| 6,963,575 | B1 | * | 11/2005 | Sistanizadeh et al. ....... 370/404 |
| 7,327,683 | B2 | * | 2/2008  | Ogier et al. .................. 370/236 |
| 7,496,650 | B1 |   | 2/2009  | Previdi et al. |
| 7,656,792 | B2 | * | 2/2010  | Zhang et al. ................. 370/228 |
| 7,688,756 | B2 | * | 3/2010  | Allan et al. .................. 370/254 |
| 7,707,307 | B2 |   | 4/2010  | Miles et al. |
| 7,792,987 | B1 | * | 9/2010  | Vohra et al. .................. 709/238 |
| 7,817,580 | B2 | * | 10/2010 | Jain et al. ..................... 370/254 |
| 7,864,712 | B2 | * | 1/2011  | Khan et al. ................... 370/256 |
| 7,889,675 | B2 | * | 2/2011  | Mack-Crane et al. ........ 370/254 |
| 8,223,660 | B2 | * | 7/2012  | Allan et al. .................. 370/248 |
| 2002/0018481 | A1 | * | 2/2002 | Mor et al. .................... 370/403 |
| 2002/0027885 | A1 | * | 3/2002 | Ben-Ami ..................... 370/254 |
| 2003/0016678 | A1 | * | 1/2003 | Maeno ......................... 370/400 |
| 2007/0086361 | A1 | * | 4/2007 | Allan et al. .................. 370/254 |
| 2007/0127395 | A1 | * | 6/2007 | Jain et al. ..................... 370/254 |
| 2008/0107018 | A1 | * | 5/2008 | Zhang et al. ................. 370/228 |
| 2013/0121256 | A1 | * | 5/2013 | Backes ......................... 370/329 |

* cited by examiner

Primary Examiner — Steven H Nguyen
(74) Attorney, Agent, or Firm — The Law Office of Kirk D. Williams

(57) ABSTRACT

In one embodiment, micro-loops are avoided in ring topologies of packet switching devices by changing the order of propagation of link state information concerning failed communications between a particular packet switching device and a neighbor packet switching device. In one embodiment, the particular packet switching device communicates link state information of a high cost of the particular communications (e.g., in the direction from particular to neighbor packet switching devices) such that this link state information will propagate towards the particular packet switching device from at least from the furthest packet switching device in the ring topology that is currently configured to forward packets having a destination address of the neighbor packet switching device through the particular packet switching device.

22 Claims, 4 Drawing Sheets

AVOIDING MICRO-LOOPS IN A RING TOPOLOGY OF A NETWORK

TECHNICAL FIELD

The present disclosure relates generally to communicating information in a network including packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

One topology of a network including packet switching devices is a ring topology, in which packet switching devices are communicatively coupled together to form the ring. Routing protocols are used to exchange information for determining how each packet switching device should forward packets in the network. For example, a link-state routing protocol is performed by each packet switching device, in which it builds a connectivity map of the network. Each packet switching device independently calculates the next best logical path from itself to other destinations in the network based on the connectivity map and the associated costs of the links communicatively coupling the packet switching devices. The collection of best paths will then form the node's routing table, which is used in the data plane to forward packets.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
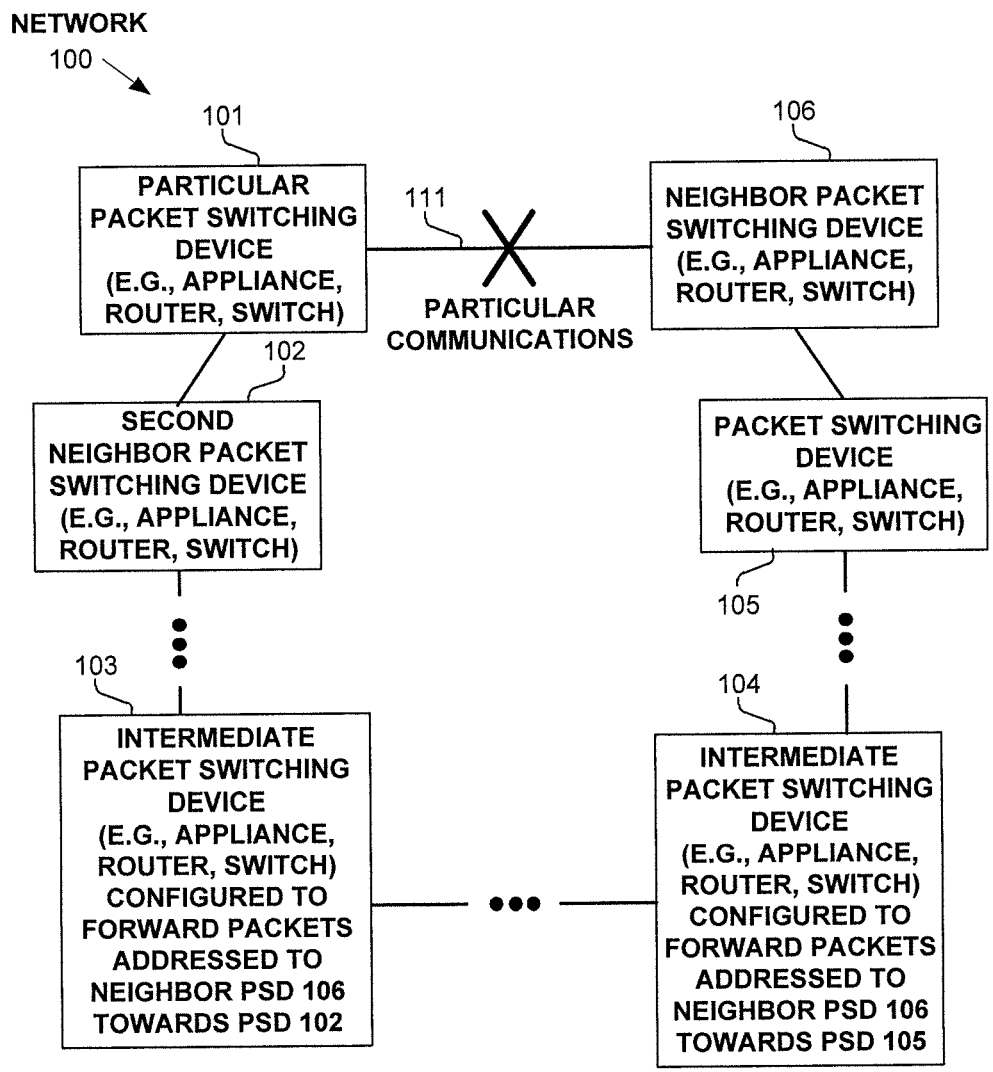
FIG. 1 illustrates a network configured to operate, and/or operating, according to one embodiment.

Disclosed are, inter alia, methods, apparatus, computer-storage media, mechanisms, and means associated with avoiding micro-loops in a ring topology of a network.

One embodiment includes a network, comprising: a plurality of packet switching devices communicatively coupled in a ring topology, with the plurality of packet switching devices including: a particular packet switching device, a neighbor packet switching device, a second neighbor packet switching device, and an intermediate packet switching device; wherein the particular packet switching device and the neighbor packet switching device are neighbors in the ring topology when particular communications is established between the particular packet switching device and the neighbor packet switching device; wherein the particular packet switching device and the second neighbor packet switching device are neighbors in the ring topology; wherein each of the plurality of packet switching devices are configured to exchange link state information and to update their respective local forwarding information accordingly. In one embodiment, the particular packet switching device is configured to cause a particular link state packet, including particular link state information identifying a very high cost of the particular communications for reaching the neighbor packet switching device from the particular packet switching device, to be communicated to the neighbor packet switching device such that said particular link state information is processed by the neighbor packet switching device before any other packet switching device in the plurality of packet switching devices; and wherein the particular packet switching device is configured not to flood said particular link state information to the second neighbor packet switching device.

One embodiment includes a network, comprising: a plurality of packet switching devices communicatively coupled in a ring topology, with the plurality of packet switching devices including: a particular packet switching device, a neighbor packet switching device, a second neighbor packet switching device, and an intermediate packet switching device; wherein the particular packet switching device and the neighbor packet switching device are neighbors in the ring topology when particular communications is established between the particular packet switching device and the neighbor packet switching device; wherein the particular packet switching device and the second neighbor packet switching device are neighbors in the ring topology; wherein each of the plurality of packet switching devices are configured to exchange link state information and to update their respective local forwarding information accordingly; wherein the intermediate packet switching device is configured to forward packets addressed to the neighbor packet switching device to another packet switching device of the plurality of packet switching devices towards the neighboring node and away from the particular packet switching device in the ring topology, or is the furthest packet switching device from the particular packet switching device in the ring topology that is configured to forward packets addressed to the neighbor packet switching device through the particular packet switching device. In one embodiment, the particular packet switching device is configured to encapsulate a particular link state packet, including particular link state information identifying a very high cost of the particular communications for reaching the neighbor packet switching device from the particular packet switching device, and to send said encapsulated particular link state packet to the intermediate packet switching device in response to the particular communications being no longer available between the particular packet switching device and the neighbor packet switching device; and wherein the particular packet switching device is configured not to flood said particular link state information to the second neighbor packet switching device.

2. Description

Disclosed are, inter alia, methods, apparatus, computer-storage media, mechanisms, and means associated with avoiding micro-loops in a ring topology of a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates network 100, including packet switching devices 101-106 arranged in a ring topology. Note, of course there can be additional packet switching devices in the ring topology, and/or additional packet switching devices connected to one or more of packet switching devices 101-106.

As shown, particular packet switching device 101 is communicatively coupled to neighbor packet switching device 106 via particular communications 111, which is initially functioning in our example network 100 of one embodiment. Additionally as shown, the other neighbor of particular packet switching device 101 is second neighbor packet switching device 102. Intermediate packet switching device 103 is configured (e.g., via a link state routing protocol) to forward packets addressed to neighbor packet switching device 106 towards packet switching device 102 in the ring topology of network 100 (and therefore through particular packet switching devices 102 and 101 to neighbor packet switching device 106). Intermediate packet switching device 104 is configured (e.g., via a link state routing protocol) to forward packets addressed to neighbor packet switching device 106 towards packet switching device 105 in the ring topology of network 100 (and therefore through particular packet switching device 105 to neighbor packet switching device 106).

In one embodiment, each of packet switching devices 101-106 operate a link-state routing protocol (e.g., Open Shortest Path First (OSPF) or Intermediate System to Intermediate System (IS-IS)) to understand the connectivity of network 100, which is used to determine how to forward packets in network 100.

When particular communications 111 fails or is otherwise taken out of service (e.g., for maintenance purposes), data packets being forwarded to neighbor packet switching device 106 (and possibly to other packet switching devices) through particular packet switching device 101 are traveling around the ring topology of network 100 towards the failure as particular packet switching device 101 is no longer communicatively coupled to neighbor packet switching device 106 via particular communications 111. Hence, to reach neighbor packet switching device 106 with particular communications 111 out of service, data packets should be sent around the ring topology of network 100 in the direction away from particular packet switching device 101/failed particular communications 111. However, the convergence of forwarding information in network 100 is not immediate in response to a change in the topology of network 100, such as in response to a failure of particular communications 111.

In response to this failure, a prior packet switching device (in the position of packet switching device 101) would send out link state information designating that particular communications 111 was no longer available, and this updated link state information would propagate around network 100 in a counter-clockwise direction, with packet switching devices serially updating their forwarding tables and forwarding the link state information. Prior systems communicate link state information in link state packets which are exchanged between only neighboring packet switching devices. Thus, for example, a prior first packet switching device in the position of packet switching device 103 in network 100 could be still sending packets to a prior second packet switching device in the position of packet switching device 102 in network 100, with the second packet switching device forwarding these packets back to the first packet switching device. This is called a micro-loop condition, as packets are being looped back to a previously sending packet switching device.

To avoid micro-loops in one embodiment, particular packet switching device 101 will communicate the link state information concerning the unavailability of particular communications 111 to a packet switching device that is already configured to forward packets addressed to neighbor packet switching device 106, but not through particular packet switching device 101. From there, this link state information concerning particular communications 111 will normally propagate between neighboring packet switching devices through network 100. In this manner, packet switching devices will typically be updated in an order to avoid one or more micro-loops.

Further, packet switching device 101 of one embodiment advertises that this link state information as being a very large cost (e.g., maxCost—1) of the now unavailable particular communications 111, rather than being in a failed condition which would be considered by a packet switching device that particular communications 111 failed in both directions. Subsequently, such as in response to receipt of this link state information or in response to the expiration of a time period, packet switching device 101 will advertise that failure of this particular communications 111 via standard link state protocol message(s).

For example, particular packet switching device 101 recognizes that particular communications 111 is no longer available. In response, particular packet switching device 101 communicates link state information, that the cost of particular communications 111 (for the direction of packet switching device 101 to 106) to be maxCost-1, to any of packet switching devices 104-106. Because each of packet switching devices 104-106 is configured to forward packets to packet switching device 106 not through particular packet switching device 101, or is packet switching device 106, the normal propagation of link state information will not result in a micro-loop (as long as the packet switching devices update their forwarding information before a next packet switching device updates its forwarding information concerning the high cost of particular communications 111).

Similarly, neighbor packet switching device 106 recognizes that particular communications 111 is no longer available. In response, neighbor packet switching device 106 communicates link state information, that the cost of particular communications 111 (for the direction of packet switching device 106 to 101) to be maxCost-1, to any of packet switching devices 101-103. Because each of packet switching devices 101-103 is configured to forward packets to packet switching device 101 not through particular packet switching device 106, or is packet switching device 101, the normal propagation of link state information will not result in a micro-loop (as long as the packet switching devices update their forwarding information before a next packet switching device updates its forwarding information concerning the high cost of particular communications 111).

Figure 2:
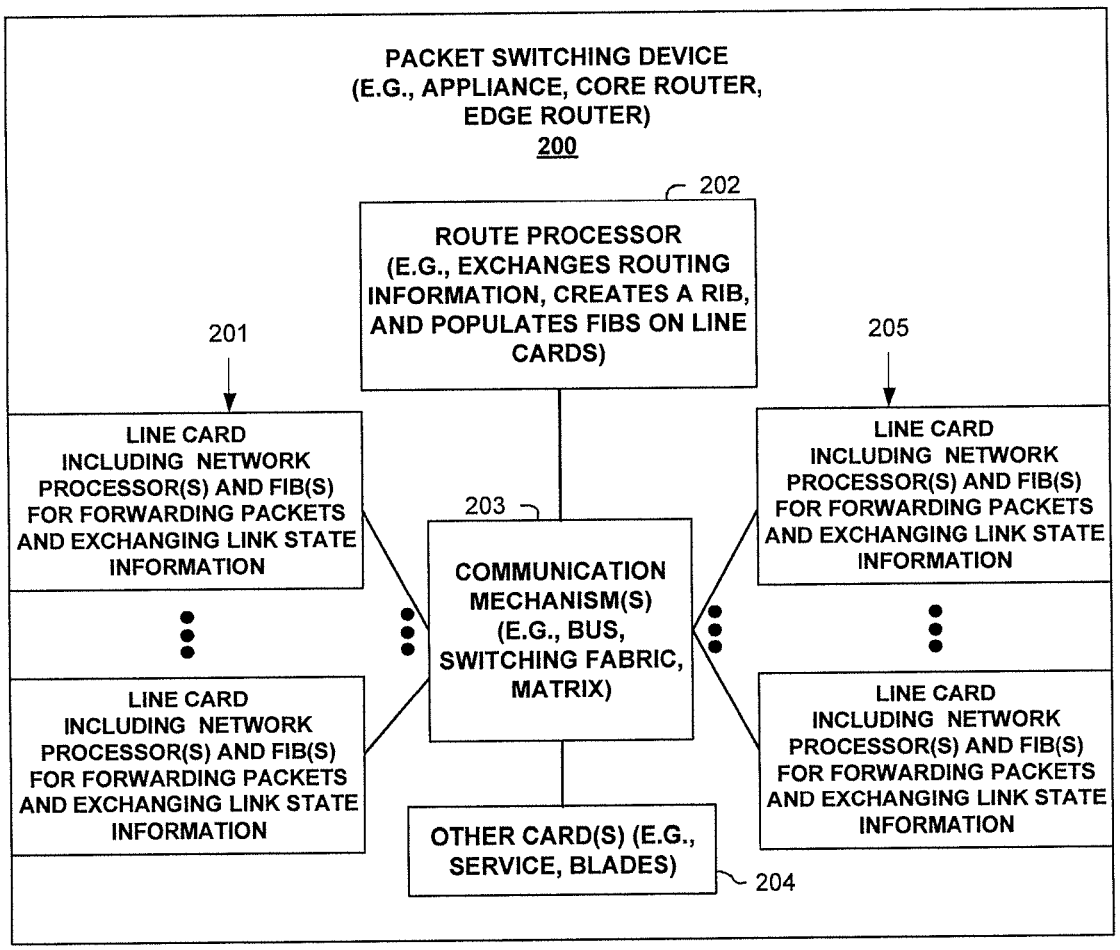
FIG. 2 illustrates a packet switching device configured to operate, and/or operating, according to one embodiment.

One embodiment of packet switching device 200 (e.g., appliance, core router, edge router) is illustrated in FIG. 2. As shown, packet switching device 200 includes line cards 201 and 205, each with one or more FIBs for use in forwarding packets.

Additionally, packet switching device 200 also has a route processor 202, which typically manages the control plane by communicating routing information (e.g., exchanging link state information) with other packet switching devices, populates one or more RIBs, and populates one or more FIBs in line cards 201 and 205 for use in communicating packets. Packet switching device 200 also includes other cards 204 (e.g., service cards, blades), and some communication mechanism 203 (e.g., bus, switching fabric, matrix) for allowing its different entities 201, 202, 204 and 205 to communicate.

Figure 3:
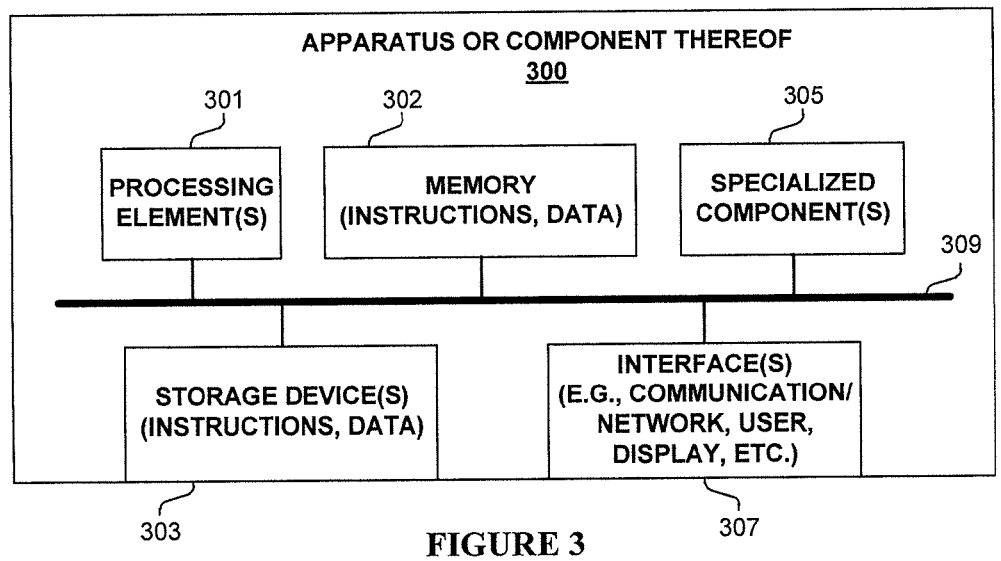
FIG. 3 illustrates an apparatus or component configured to operate, and/or operating, according to one embodiment.

FIG. 3 is a block diagram of an apparatus or component 300 used in one embodiment. One embodiment includes one or more packet switching devices, and/or one or more packet switching devices configured to operate, or actually operating, in a network. In one embodiment, apparatus or component 300 performs one or more processes corresponding to one of the flow diagrams illustrated or otherwise described herein, and/or illustrated in another diagram or otherwise described herein.

In one embodiment, apparatus or component 300 includes one or more processing element(s) 301, memory 302 (e.g., one or more memories), storage device(s) 303, specialized component(s) 305 (e.g. optimized hardware such as for converting addresses, performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of a particular application. In one embodiment, apparatus or component 300 corresponds to, or is part of, a packet switching device 101-106 of FIG. 1.

Various embodiments of apparatus or component 300 may include more or fewer elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 5:
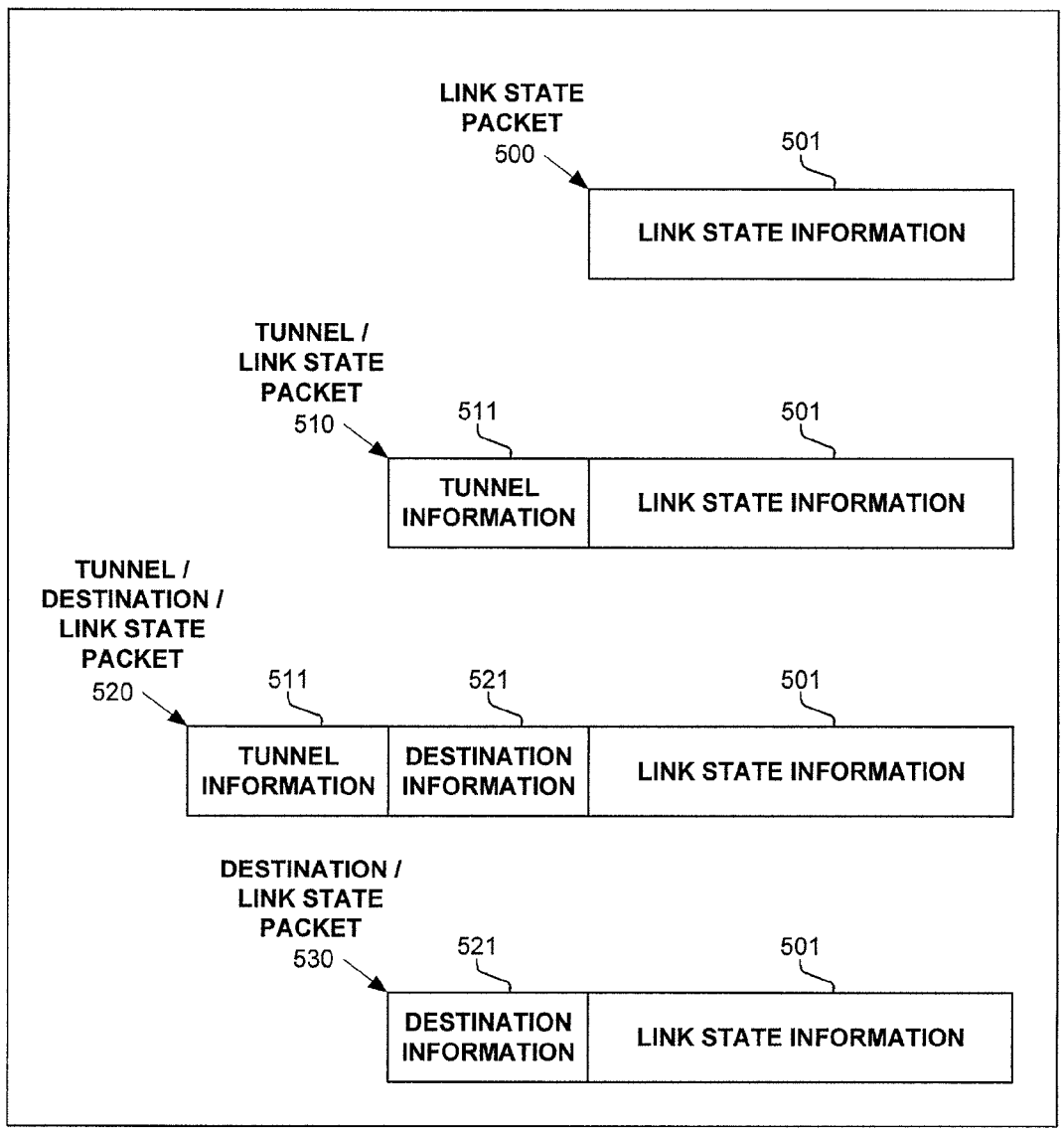
FIG. 5 illustrates different packets used to exchange link state information in one embodiment.

Briefly, illustrated in FIG. 5 are generalizations of four different packets possibly used in one embodiment to communicate link state information 501 between packet switching devices. A basic link state packet 500 is shown which includes link state information 501. Also, shown is a tunnel/link state packet 510 which is used in one embodiment to tunnel link state information 501 to a packet switching device. Tunnel information 511 is used to represent information typically included in a header of a packet being tunneled, with tunnel information being such as, but not limited to Multiprotocol Label Switching (MPLS) label(s), Internet Protocol (IP) address(es), and/or other forwarding information. Also, shown is a tunnel/destination/link state packet 520 which is used in one embodiment to tunnel a packet including destination information 521 and link state information 501 to a packet switching device. This packet switching device will then send a destination/link state packet 530 including link state information 501 to a destination packet switching device identified by destination information 521 (e.g., MPLS label(s), IP address, and/or other forwarding information, etc.). In one embodiment, destination/link state packet 530 is used to communicate link state information 501 from a particular packet switching device to an intermediate packet switching device identified by destination information 521.

Figure 4:
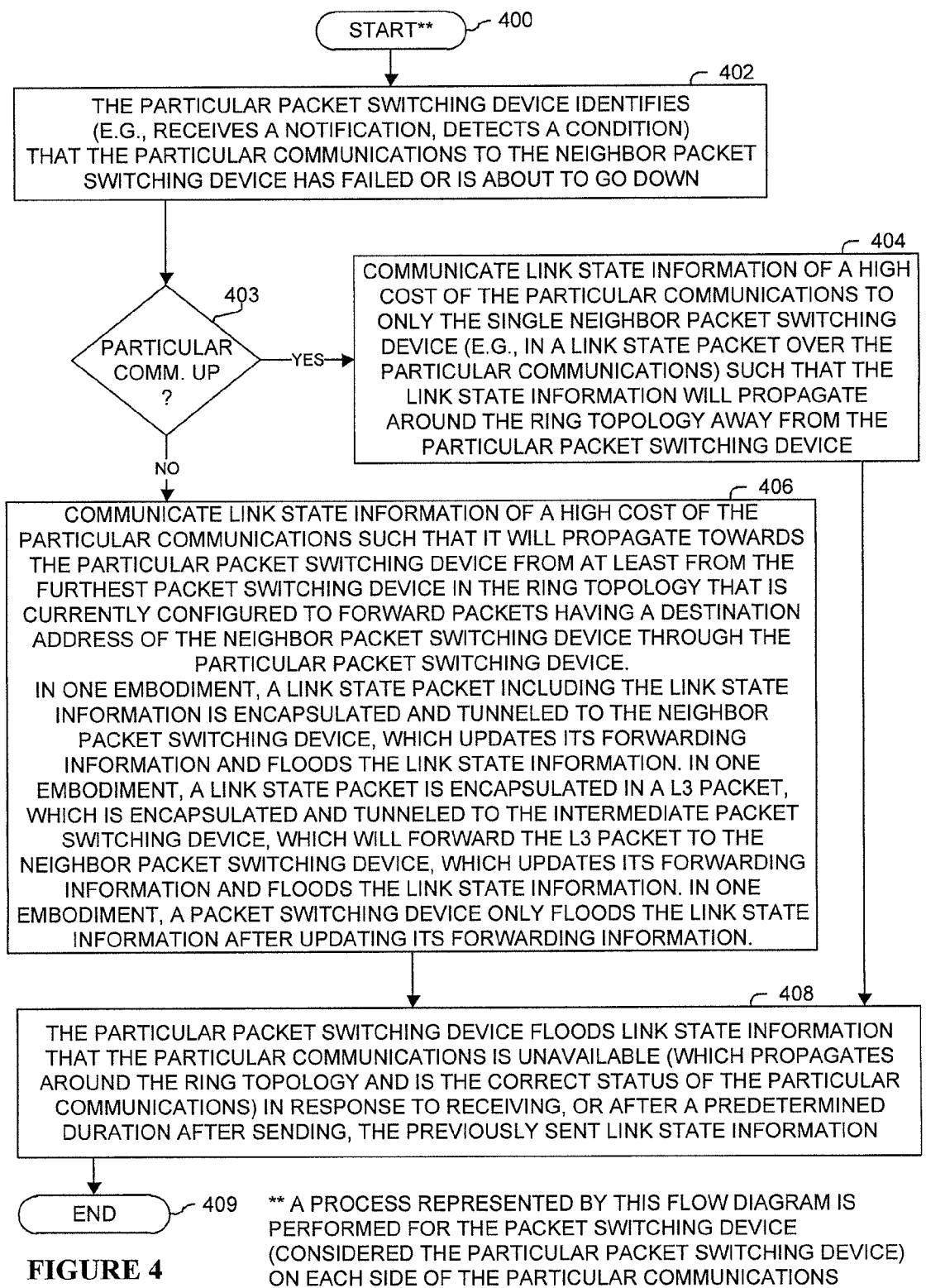
FIG. 4 illustrates a process configured to be performed, and/or performed, in one embodiment.

FIG. 4 illustrates a process configured to be performed, and/or performed, in one embodiment. Processing begins with process block 400. Note, the process illustrated by FIG. 4 is performed by each particular packet switching device of the packet switching devices on both sides of the particular communications which has failed or to be taken out of service.

In process block 402, the particular packet switching device identifies (e.g., receives a notification, detects a condition) that the particular communications to the neighbor packet switching device has failed or is about to go down.

As determined in process block 403, if the particular communications is still up (e.g., it will be taken down shortly), then, in process block 404, the particular packet switching device directly communicates to, and only to, the neighbor packet switching device of the high cost of the particular communications (e.g., from the particular to the neighbor packet switching device). This link state information will therefore propagate around the packet switching devices in the ring topology in a order to avoid micro loops. FIG. 5 illustrates a link state packet 500 used to communicate link state information 501 in one embodiment.

Otherwise as determined in process block 403 of FIG. 4, the particular communications has failed. In process block 406, the particular packet switching device communicates link state information of a high cost of the particular communications (e.g., in the direction from particular to neighbor packet switching devices) such that it will propagate towards the particular packet switching device from at least from the furthest packet switching device in the ring topology that is currently configured to forward packets having a destination address of the neighbor packet switching device not through the particular packet switching device. In one embodiment, the particular packet switching device uses a packet 510, 520 or 530 (of FIG. 5) to communicate this link state information.

In one embodiment, the particular link state information is marked using a type-length-value field (TLV) or via some other mechanism to inform the packet switching device receiving this link state information that it corresponds to information to be updated in a manner to prevent or minimize micro-loops. Based on this marking, a packet switching device might delay the further flooding of this particular link state information to another packet switching device until it has updated the contents of its forwarding information to reflect the high cost of the particular communications (e.g., link). If all packet switching devices in the ring topology delay flooding until its respective forwarding information has been updated, this ensures that even where individual packet switching devices process the information and update their forwarding information at different speeds, the correct ordering of the forwarding information updating for minimizing or elimination micro loops will be maintained.

As the particular packet switching device of one embodiment advertised a high-cost of the particular communications which is technically not correct information, in process block 408 of FIG. 4, the particular packet switching device floods link state information that the particular communications is unavailable (which propagates around the ring topology and is the correct status of the particular communications) in response to receiving, or after a predetermined duration after sending, the previously sent link state information. In one embodiment, the particular packet switching device identifies that it has received the previously sent link state information based on a sequence number associated with the previously sent link state information, or via some other mechanism. Processing of the flow diagram of FIG. 4 is complete as indicated by process block 409.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A network, comprising:
   a plurality of packet switching devices communicatively coupled in a ring topology, with the plurality of packet switching devices including: a particular packet switching device, a first neighbor packet switching device, a second neighbor packet switching device, and an intermediate packet switching device; wherein the particular packet switching device is coupled as a neighbor to the first neighbor in the ring topology over particular communications such that the particular packet switching device and the first neighbor packet switching device are neighbors in the ring topology when said particular communications is available between the particular packet switching device and the first neighbor packet switching device; wherein the particular packet switching device and the second neighbor packet switching device are neighbors in the ring topology over different communications; wherein each of the plurality of packet switching devices are configured to exchange link state information with their current neighbors in the ring topology and to update their respective local forwarding information accordingly; and
   wherein the particular packet switching device is configured to cause a particular link state packet, including particular link state information identifying a very high cost of said particular communications for reaching the first neighbor packet switching device from the particular packet switching device, to be communicated to the first neighbor packet switching device through the ring topology such that said particular link state information is processed by the first neighbor packet switching device before any other packet switching device in the plurality of packet switching devices with corresponding particular link state information subsequently being propagated around the ring topology towards the particular packet switching device; and wherein the particular packet switching device is configured at least immediately not to flood said particular link state information to the second neighbor packet switching device to provide time for said propagating around the ring topology to occur first.

2. The network of claim 1, wherein said configuration of the particular switching device includes said causing of the particular link state packet to be communicated to the first neighbor packet switching device in response to the particular communications being no longer available between the particular packet switching device and the first neighbor packet switching device.

3. The network of claim 1, wherein the intermediate packet switching device is configured to forward packets addressed to the first neighbor packet switching device to another packet switching device of the plurality of packet switching devices towards the first neighbor packet switching device and away from the particular packet switching device in the ring topology;

wherein the packet switching device is configured to communicate with the intermediate packet switching device via a tunnel through one or more packet switching devices of the plurality of packet switching devices but not over said particular communications; and wherein said causing of the particular link state packet to be communicated to the first neighbor packet switching device includes sending a tunnel packet, including a packet addressed to the first neighbor packet switching device and including the particular link state packet, over the tunnel.

4. The network of claim 1, wherein the particular packet switching device is configured to flood to the second neighbor packet switching device, subsequent to said causing of the particular link state packet to be communicated to the first neighbor packet switching device, link state information identifying the unavailability of the particular communications after providing time for said propagating around the ring topology to occur first.

5. The network of claim 4, wherein said flooding of said link state information identifying the unavailability of the particular communications is configured to be performed in response to the particular packet switching device receiving the particular link state information from the second neighbor packet switching device.

6. The network of claim 4, wherein said flooding of said link state information identifying the unavailability of the particular communications is configured to be performed in response to an expiration of a time period after said causing of the particular link state packet to be communicated to the first neighbor packet switching device.

7. The network of claim 1, wherein each packet switching device, different than the particular packet switching device, of the plurality of packet switching devices is configured to flood said particular link state information only after updating its local forwarding information.

8. A network, comprising:

a plurality of packet switching devices communicatively coupled in a ring topology, with the plurality of packet switching devices including: a particular packet switching device, a first neighbor packet switching device, a second neighbor packet switching device, and an intermediate packet switching device; wherein the particular packet switching device is coupled as a neighbor to the first neighbor in the ring topology over particular communications such that the particular packet switching device and the first neighbor packet switching device are neighbors in the ring topology when said particular communications is available between the particular packet switching device and the first neighbor packet switching device; wherein the particular packet switching device and the second neighbor packet switching device are neighbors in the ring topology over different communications; wherein each of the plurality of packet switching devices are configured to exchange link state information with their current neighbors in the ring topology and to update their respective local forwarding information accordingly; wherein the intermediate packet switching device is configured to forward packets addressed to the first neighbor packet switching device to another packet switching device of the plurality of packet switching devices towards the first neighbor packet switching device and away from the particular packet switching device in the ring topology, or the intermediate packet switching device is the furthest packet switching device from the particular packet switching device in the ring topology that is configured to forward packets addressed to the first neighbor packet switching device through the particular packet switching device in the ring topology; and wherein the particular packet switching device is configured to encapsulate a particular link state packet, including particular link state information identifying a very high cost of said particular communications for reaching the first neighbor packet switching device from the particular packet switching device, and to send said encapsulated particular link state packet to the intermediate packet switching device in response to said particular communications being no longer available between the particular packet switching device and the first neighbor packet switching device such that said particular link state information is processed by the intermediate packet switching device before any other packet switching device in the plurality of packet switching devices with corresponding particular link state information subsequently being propagated around the ring topology towards the particular packet switching device; and wherein the particular packet switching device is configured at least immediately not to flood said particular link state information to the second neighbor packet switching device to provide time for said propagating around the ring topology to occur first.

9. The network of claim 8, wherein the intermediate packet switching device is configured to process said particular link state information, and to flood said particular link state information to a next packet switching device of the plurality of packet switching devices towards the particular packet switching device.

10. The network of claim 9, wherein the intermediate packet switching device is configured to flood said particular link state information to a next packet switching device of the plurality of packet switching devices towards the first neighbor packet switching device.

11. The network of claim 8, wherein said encapsulated particular link state packet is communicated over a tunnel between the particular packet switching device and the intermediate packet switching device.

12. The network of claim 8, wherein the particular packet switching device is configured to flood to the second neighbor packet switching device, subsequent to said sending said encapsulated particular link state packet to the intermediate packet switching device, link state information identifying the unavailability of the particular communications after providing time for said propagating around the ring topology to occur first.

13. The network of claim 12, wherein said flooding of said link state information identifying the unavailability of the particular communications is configured to be performed in response to the particular packet switching device receiving the particular link state information from the second neighbor packet switching device.

14. The network of claim 12, wherein said flooding of said link state information identifying the unavailability of the particular communications is configured to be performed in response to an expiration of a time period after said sending said encapsulated particular link state packet to the intermediate packet switching device.

15. A method, comprising:

performing operations by a particular packet switching device in a network; wherein the network includes a plurality of packet switching devices communicatively coupled in a ring topology, with the plurality of packet switching devices including: the particular packet switching device, a first neighbor packet switching device, a second neighbor packet switching device, and an intermediate packet switching device; wherein the particular packet switching device is coupled as a neighbor to the first neighbor in the ring topology over particular communications such that the particular packet switching device and the first neighbor packet switching device are neighbors in the ring topology when said particular communications is available between the particular packet switching device and the first neighbor packet switching device; wherein the particular packet switching device and the second neighbor packet switching device are neighbors in the ring topology over different communications; wherein each of the plurality of packet switching devices are configured to exchange link state information with their current neighbors in the ring topology and to update their respective local forwarding information accordingly; and wherein said operations include:

generating a particular link state packet, including particular link state information identifying a very high cost of said particular communications for reaching the first neighbor packet switching device from the particular packet switching device; and communicating the particular link state packet to the first neighbor packet switching device through the ring topology providing time for processing of said particular link state information by the first neighbor packet switching device before any other packet switching device in the plurality of packet switching devices and for corresponding particular link state information to be subsequently propagated around the ring topology towards the particular packet switching device, but not immediately flooding by the particular packet switching device said particular link state information to the second neighbor packet switching device to provide time for said propagating around the ring topology to occur first.

16. The method of claim 15, wherein said operation of generating the particular link state packet is performed in response to the particular communications being no longer available between the particular packet switching device and the first neighbor packet switching device.

17. The method of claim 16, wherein said operations include flooding to the second neighbor packet switching device, subsequent to said communicating the particular link state packet to the first neighbor packet switching device, link state information identifying the unavailability of the particular communications after providing time for said propagating around the ring topology to occur first.

18. The method of claim 15, wherein the intermediate packet switching device is configured to forward packets addressed to the first neighbor packet switching device to another packet switching device of the plurality of packet switching devices towards the first neighbor packet switching device and away from the particular packet switching device in the ring topology; and wherein said operation of communicating the particular link state packet to the first neighbor packet switching device includes sending a tunnel packet, including a packet addressed to the first neighbor packet switching device and including the particular link state packet, over a tunnel through one or more packet switching devices of the plurality of packet switching devices to the intermediate packet switching device.

19. A method, comprising:

performing operations by a particular packet switching device in a network; wherein the network includes a plurality of packet switching devices communicatively coupled in a ring topology, with the plurality of packet switching devices including: the particular packet switching device, a first neighbor packet switching device, a second neighbor packet switching device, and an intermediate packet switching device; wherein the particular packet switching device is coupled as a neighbor to the first neighbor in the ring topology over particular communications such that the particular packet switching device and the first neighbor packet switching device are neighbors in the ring topology when said particular communications is available between the particular packet switching device and the first neighbor packet switching device; wherein the particular packet switching device and the second neighbor packet switching device are neighbors in the ring topology over different communications; wherein each of the plurality of packet switching devices are configured to exchange link state information with their current neighbors in the ring topology and to update their respective local forwarding information accordingly; and wherein said operations include:

encapsulating a particular link state packet, including particular link state information identifying a very high cost of said particular communications for reaching the first neighbor packet switching device from the particular packet switching device; and sending said encapsulated particular link state packet to the intermediate packet switching device in response to said particular communications being no longer available between the particular packet switching device and the first neighbor packet switching device providing time for processing of said particular link state information by the intermediate packet switching device before any other packet switching device in the plurality of packet switching devices and for corresponding particular link state information to be subsequently propagated around the ring topology towards the particular packet switching device, but not immediately flooding by the particular packet switching device said particular link state information to the second neighbor packet switching device to provide time for said propagating around the ring topology to occur first.

20. The method of claim 19, comprising:

processing, by the intermediate packet switching device, said particular link state information to update forwarding information of the intermediate packet switching device; and flooding said particular link state information to a next packet switching device of the plurality of packet switching devices towards the particular packet switching device, and to a next packet switching device of the plurality of packet switching devices towards the first neighbor packet switching device.

21. The method of claim 20, wherein the intermediate packet switching device is configured to forward packets addressed to the first neighbor packet switching device to another packet switching device of the plurality of packet switching devices towards the first neighbor packet switching device and away from the particular packet switching device in the ring topology, or is the furthest packet switching device from the particular packet switching device in the ring topology that is configured to forward packets addressed to the first neighbor packet switching device through the particular packet switching device in the ring topology.

22. The method of claim 21, wherein said operations include flooding to the second neighbor packet switching device, subsequent to sending said encapsulated particular link state packet to the intermediate packet switching device, link state information identifying the unavailability of the particular communications.

* * * * *